(12) United States Patent
Liu

(10) Patent No.: US 9,581,785 B2
(45) Date of Patent: Feb. 28, 2017

(54) SPRINGLESS VOICE COIL ACTUATOR AND PRE-COMPRESSION MAGNETIC FORCE CALIBRATION METHOD THEREOF

(71) Applicant: NATIONAL CHUNG CHENG UNIVERSITY, Chia-Yi (TW)

(72) Inventor: Chien-Sheng Liu, Tainan (TW)

(73) Assignee: NATIONAL CHUNG CHENG UNIVERSITY, Chia-yi (TW)

( * ) Notice: Subject to any disclaimer, the term of this patent is extended or adjusted under 35 U.S.C. 154(b) by 333 days.

(21) Appl. No.: 14/188,646

(22) Filed: Feb. 24, 2014

(65) Prior Publication Data
US 2015/0049397 A1    Feb. 19, 2015

(30) Foreign Application Priority Data

Aug. 14, 2013    (TW) .............................. 102129153 A

(51) Int. Cl.
G02B 7/02    (2006.01)
G02B 7/08    (2006.01)
G02B 13/00   (2006.01)

(52) U.S. Cl.
CPC .............. *G02B 7/08* (2013.01); *G02B 13/009* (2013.01)

(58) Field of Classification Search
USPC ....... 359/811, 813, 815, 819, 820, 821, 822, 359/823, 824, 826
See application file for complete search history.

(56) References Cited

U.S. PATENT DOCUMENTS

2008/0284255 A1*  11/2008  Liu ........................ G02B 7/102
                                                          310/12.16

* cited by examiner

*Primary Examiner* — Joseph P Martinez
*Assistant Examiner* — Brandi Thomas
(74) *Attorney, Agent, or Firm* — CKC & Partners Co., Ltd.

(57) ABSTRACT

A springless voice coil actuator is provided. The springless voice coil includes a base, a coil, a guiding rod, a slidable base, a main magnetic component and a balance magnetic component. The coil is disposed on the base. The guiding rod is disposed on the base. The slidable base is for sliding along the guiding rod to a predetermined direction. The main magnetic component is connected to the slidable base. The balance magnetic component is coupled with the main magnetic component for generating a magnetic induction.

11 Claims, 12 Drawing Sheets

SPRINGLESS VOICE COIL ACTUATOR AND PRE-COMPRESSION MAGNETIC FORCE CALIBRATION METHOD THEREOF

RELATED APPLICATIONS

The application claims priority to Taiwan Application Serial Number 102129153, filed on Aug. 14, 2013, which is herein incorporated by reference.

BACKGROUND

Technical Field

The present disclosure relates to an actuator and pre-compression magnetic force calibration method thereof, especially relates to a springless voice coil actuator and pre-compression magnetic force calibration method thereof.

Description of Related Art

As the development of technology, pixels of a camera module for mobile phones are increasingly higher to achieve, so far, tens of megapixels of resolution. However, the quality of the photos taken by the camera module in a mobile phone is not only depended on the higher resolution, but also on the auto-focusing lens module of the camera module. Recently, various actuators for the auto-focusing lens module can be obtained, such as voice coil motor (VCM), stepping motor, piezoelectric motor, liquid lens, enhanced crystal lens and polymer deformable membrane.

The aforementioned actuators for the auto-focusing lens modules are normally classified into a rotationally-driven type and a transnationally-driven type.

The rotationally-driven type actuator (e.g. stepping motor) mainly features that such actuator itself can drive the lens module to move and be in position with no need of extra electric power. However, the rotational movement of the stepping motor should be transformed to a linear movement by an extra mechanism in order to drive the lens module to move parallel to the optical axis. For obtaining a precision control, the structure of the extra mechanism is complicated and the size becomes larger, which is not favorable to the miniaturization of the lens module.

In this regard, the transnationally-driven type actuator has reached in the market for obtaining compact size and simple structure for the lens module. The main advantage of the transnationally-driven type actuator (e.g. voice coil motor, piezoelectric motor or liquid lens) is its direct control on the displacement of the lens module. Thus, the transnationally-driven type actuators have been in active development. Among such transnationally-driven type actuators, the voice coil motor is the one widely used owing to the advantages such as low cost, compact size, energy consumption, precision position and rapid response.

The main structure of the voice coil motor (actuator) is to dispose a coil into a magnetic circuit formed by a permanent-magnetism. According to Fleming's left-hand rule, when a current is exerted to the coil, the coil is interactive with a magnetic field of the permanent-magnetism and forming a pushing force. The pushing force pushes the lens module to generate a displacement thereby forming an auto-focusing or an auto-zooming. During the process of auto-focusing, a pre-compression force having direction opposite to the pushing force is necessary, in an open-loop control, for balancing and precisely positioning the lens module into a correct position.

Conventional voice coil actuator can be classified to an open-loop control and a close-loop control. In the open-loop control, an elastic force of a spring is utilized as a pre-compression force; the pre-compression force is balanced with the pushing force for repeatedly positioning the lens module. In the close-loop control, an extra position measurement component (e.g. Hall element) is utilized for generating a position feedback signal, and the lens module is positioned in accordance with the position feedback signal. The close-loop controlled actuator has disadvantage on high cost from extra-added position measurement component and complicated circuit design. Therefore, the open-loop controlled voice coil actuator is more popular in the field. However, there are some deficiencies in the open-loop controlled voice coil. First, the open-loop controlled voice coil actuator conventionally utilizes the elastic force of the spring, which is very complicated in structure, as the pre-compression force, and thus the manufacturing process also becomes more complicated and incurs the higher manufacturing cost. Second, the elastic force of the spring is not easy to be designed, and the pre-compression force is usually increased too fast. As a result, a larger current is required for balancing owing to the rigidity must be large enough to overcome the runout of the optical axis of the lens module. Therefore, the energy consumption is large, which does not meet the energy saving requirement.

SUMMARY

According to one aspect of the present disclosure, a springless voice coil actuator is provided. The springless voice coil includes a base, a coil, a guiding rod, a slidable base, a main magnetic component and a balance magnetic component. The coil is disposed on the base. The guiding rod is disposed on the base. The slidable base is configured to slide along the guiding rod to a predetermined direction. The main magnetic component is connected to the slidable base. The balance magnetic component is coupled with the main magnetic component for generating a magnetic induction.

Wherein when a current is exerted to the coil, the main magnetic component is coupled with the coil for generating a pushing force, the pushing force pushes the slidable base, the main magnetic component is coupled with the guiding rod for generating a first pre-compression magnetic force, the balance magnetic component is coupled with the main magnetic component for generating a second pre-compression magnetic force, the first pre-compression magnetic force is combined with the second pre-compression magnetic force for generating a total pre-compression magnetic force, and the total pre-compression magnetic force is balanced with the pushing force and positioning the slidable base.

According to another aspect of the present disclosure, a pre-compression magnetic force calibration method applicable to the springless voice coil actuator is provided. The pre-compression magnetic force calibration method includes: a first pre-compression magnetic force is generated by coupling the main magnetic component and the guiding rod; a second pre-compression magnetic force is generated by coupling the balance magnetic component and the main magnetic component; and the first pre-compressing magnetic force and the second pre-compression magnetic force are combined and generating a linear-outputted total pre-compression magnetic force.

According to still another aspect of the present disclosure, a pre-compression magnetic force calibration method applicable to the springless voice coil actuator is provided. The pre-compression magnetic force calibration method includes: a first pre-compression magnetic force is generated by coupling the main magnetic component and the guiding rod; a second pre-compression magnetic force is generated by coupling the balance magnetic component and the main magnetic component; a third pre-compression magnetic force is generated by coupling the sub-balance component and the main magnetic component; and the first pre-compressing magnetic force, the second pre-compression magnetic force and the third pre-compressing magnetic force are combined and generating a linear-outputted total pre-compression magnetic force.

According to further another aspect of the present disclosure, a springless voice coil actuator is provided. The springless voice coil actuator includes a base, a coil, a slidable base, a main magnetic component, a balance magnetic component, and a sub-balance component. The coil is disposed on the base. The slidable base slides to a predetermined direction relative to the base. The main magnetic component is connected to the slidable base. The balance magnetic component is coupled with the main magnetic component for generating a magnetic induction. The sub-balance component is coupled with the main magnetic component for generating another magnetic induction.

Wherein when a current is exerted to the coil, the main magnetic component is coupled with the coil for generating a pushing force, the pushing force pushes the slidable base; the main magnetic component is coupled with the balance magnetic component for generating a first pre-compression magnetic force, the sub-balance component is coupled with the main magnetic component for generating a second pre-compression magnetic force, the first pre-compression magnetic force is combined with the second pre-compression magnetic force for generating a total pre-compression magnetic force, and the total pre-compression magnetic force is balanced with the pushing force and positioning the slidable base.

According to another aspect of the present disclosure, a pre-compression magnetic force calibration method applicable to the springless voice coil actuator is provided. The pre-compression magnetic force calibration method includes: a first pre-compression magnetic force is generated by coupling the balance magnetic component and the main magnetic component; a second pre-compression magnetic force is generated by coupling the sub-balance component and the main magnetic component; and the first pre-compressing magnetic force and the second pre-compression magnetic force are combined and generating a linear-outputted total pre-compression magnetic force.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
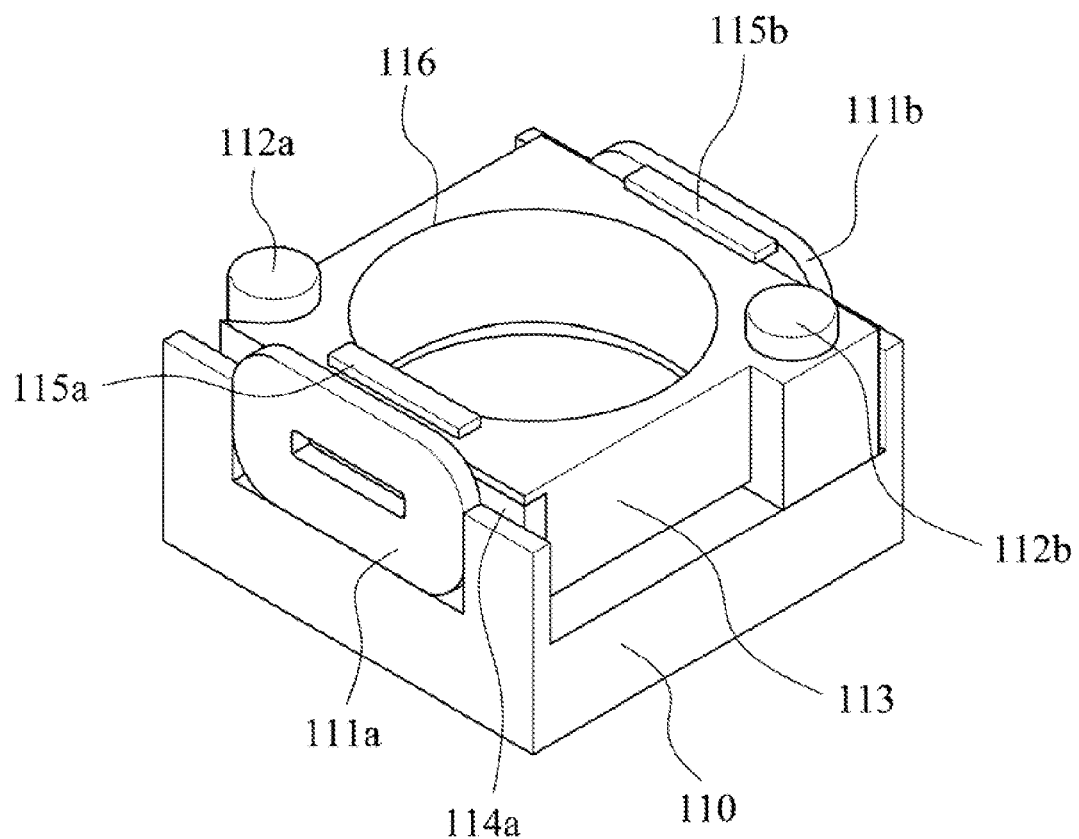
FIG. 1 is a three-dimensional view showing a springless voice coil actuator according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The present disclosure provides a springless voice coil actuator which utilizes a magnetic force to replace an elastic force of a spring, and the magnetic force is acting as a pre-compression force. Therefore, the spring is not required, and the hard design of the elastic force can be eliminated. The present disclosure also provides a pre-compression magnetic force calibration method for obtaining a linear-outputted total pre-compression magnetic force. Therefore, a precision positioning can be achieved.

Figure 2:
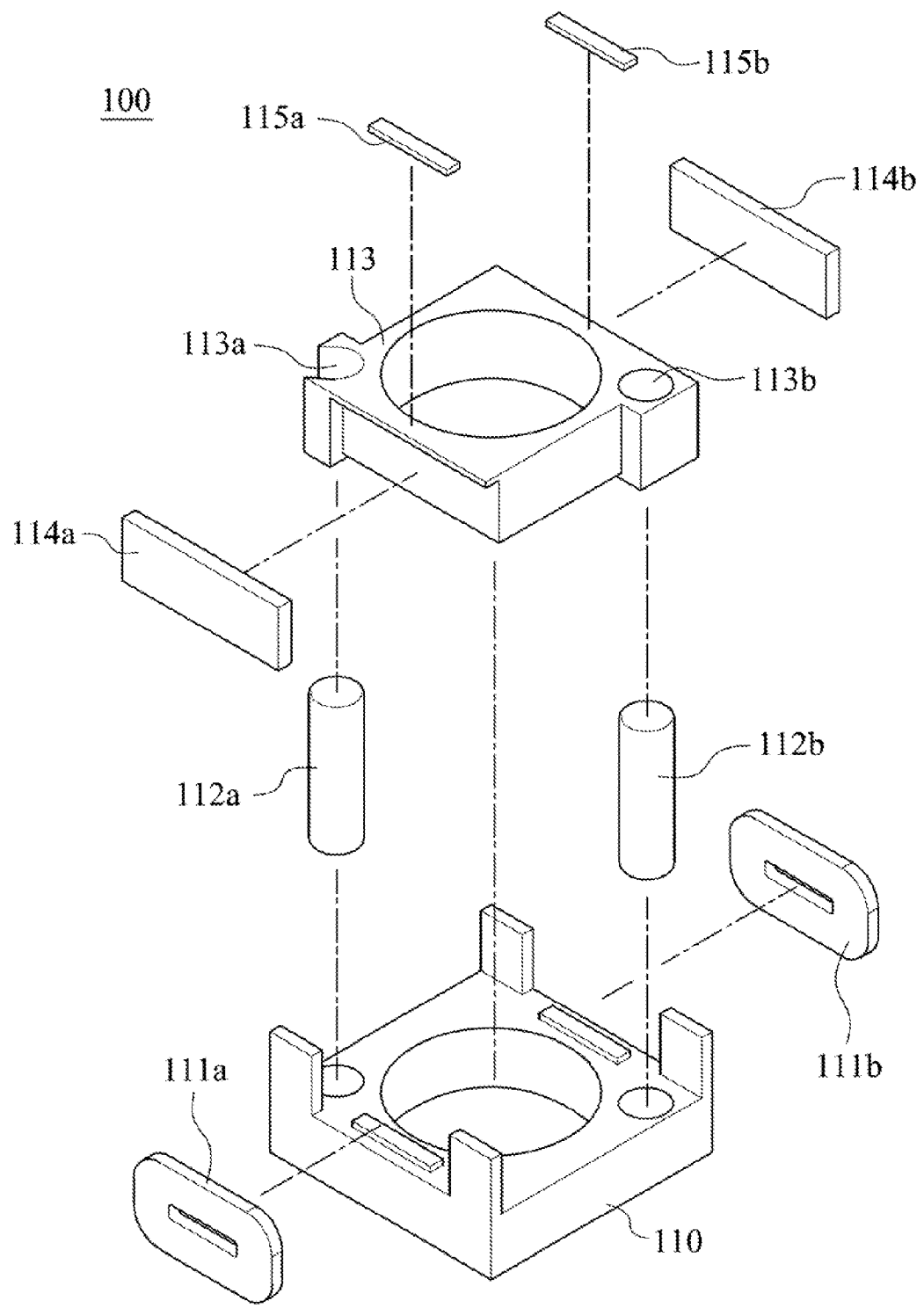
FIG. 2 is an exploded view of the springless voice coil actuator of FIG. 1.

FIG. 1 is a three-dimensional view showing a springless voice coil actuator 100 according to one embodiment of the present disclosure. FIG. 2 is an exploded view of the springless voice coil actuator 100 of FIG. 1. The springless voice coil actuator 100 includes a base 110, a first coil 111a, a second coil 111b, a first guiding rod 112a, a second guiding rod 112b, a slidable base 113, a first main magnetic component 114a, a second main magnetic component 114b, a first balance magnetic component 115a and a second balance magnetic component 115b. In the present disclosure, the quantity of the coil, the guiding rod, the main magnetic component, the balance magnetic component can be a single one or a pair. In the embodiment, the coils, the guiding rods, the main magnetic components, and the balance magnetic components are disposed in pair.

The first coil 111a and the second coil 111b are disposed on two opposite sides of the base 110. A current direction in the first coil 111a and the second coil 111b are also opposite.

The first guiding rod 112a and the second guiding rod 112b are disposed on the other two opposite sides of the base 111. It is known that the position of the first coil 111a, the second coil 111b, the first guiding rod 112a and the second guiding rod 112b are not limited.

A first opening 113a and a second opening 113b are disposed on the slidable base 113, and the position of the first opening 113a and the second opening 113b are corresponded to the first guiding rod 112a and the second guiding rod 112b. The first guiding rod 112a and the second guiding rod 112b are installed through the first opening 113a and the second opening 113b respectively. Therefore, the first guiding rod 112a and the second guiding rod 112b constrain the displacement of the slidable base 113, thus reducing deflection of the slidable base 113 during sliding.

The first main magnetic component 114a and the second magnetic component 114b are connected to two sides of the slidable base 113. The first magnetic component 114a and the second magnetic component 114b are acted as permanent magnetisms, and are coupled with the first coil 111a and the second coil 111b for generating a pushing force. A first pre-compression magnetic force are generated by coupling the first main magnetic component 114a and the second main magnetic component 114b with the first guiding rod 112a and the second guiding rod 112b.

A second pre-compression magnetic force is generated by coupling the first balance magnetic component 115a and the second balance magnetic component 115b with the first main magnetic component 114a and the second main magnetic component 114b.

Figure 3:
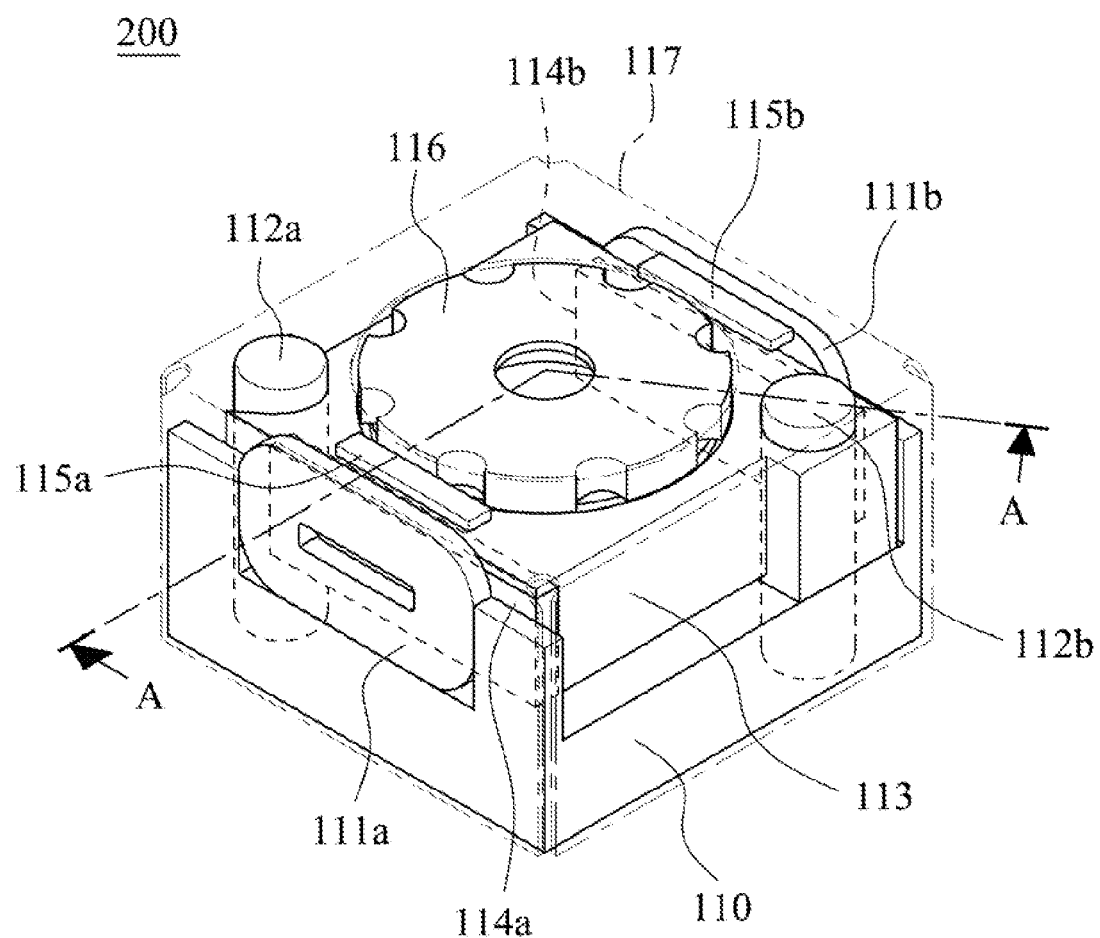
FIG. 3 is a three-dimensional view showing an auto-focusing lens module according to one embodiment of the present disclosure.
Figure 4:
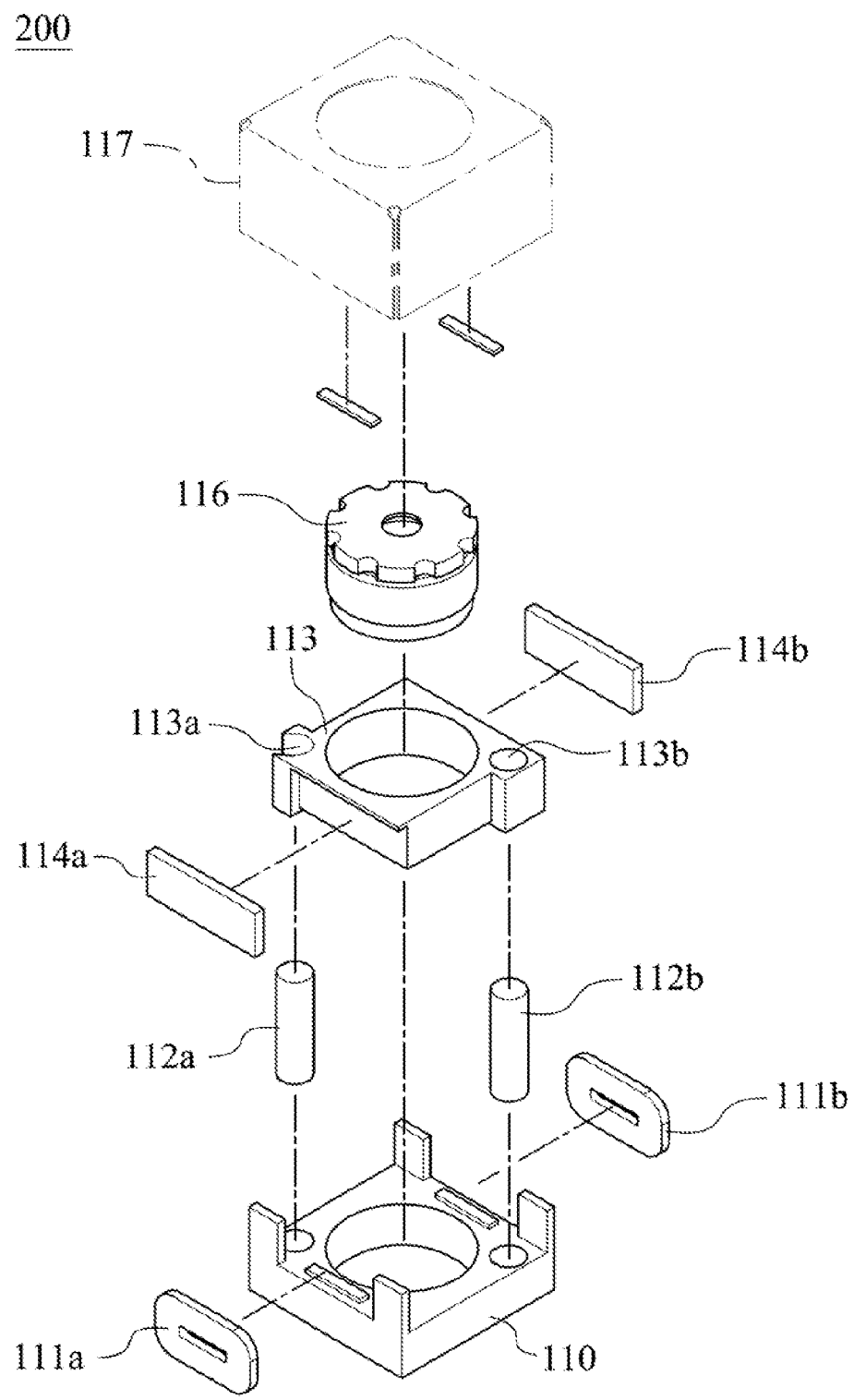
FIG. 4 is an exploded view of the auto-focusing lens module of FIG. 3.
Figure 5:
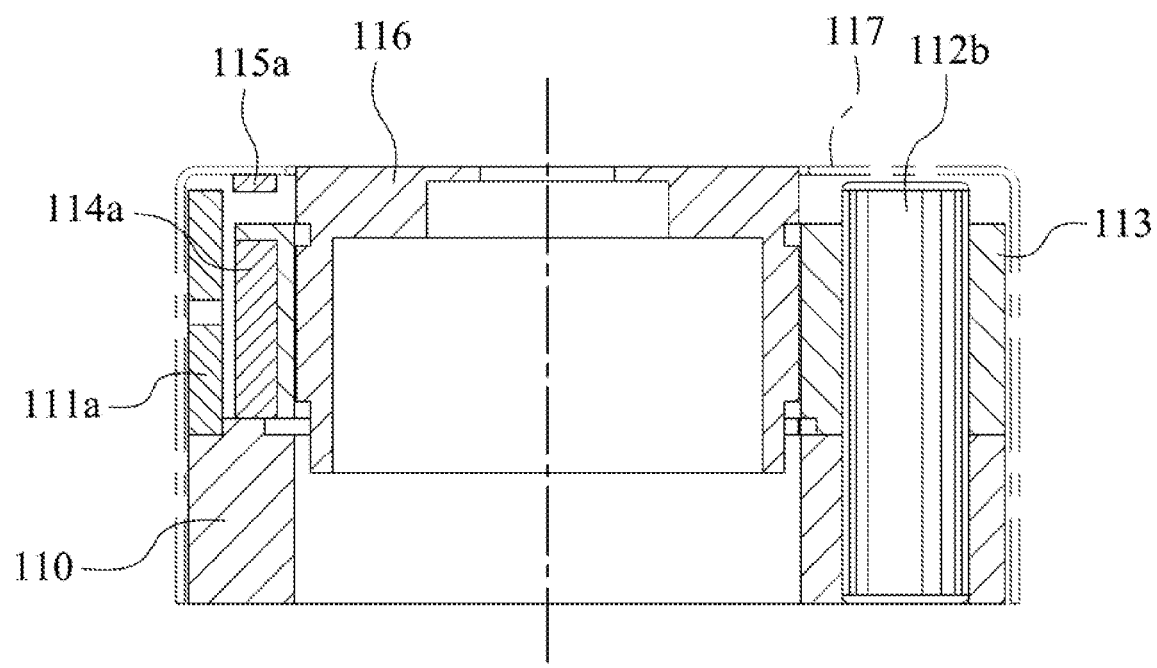
FIG. 5 is a sectional view of the auto-focusing lens module of FIG. 3 taken along A-A line.

FIG. 3 is a three-dimensional view showing an auto-focusing lens module 200 according to one embodiment of the present disclosure. FIG. 4 is an exploded view of the auto-focusing lens module 200 of FIG. 3. FIG. 5 is a sectional view of the auto-focusing lens module 200 of FIG. 3 taken along A-A line. The auto-focusing lens module 200 includes at least a lens assembly 116 and a springless voice coil actuator 100. The springless voice coil actuator 100 is used for pushing the lens assembly 116 to form a displacement, thereby forming an auto-focusing or a zooming. In FIG. 4, it is showed that the lens assembly 116 is driven by the slidable base 113 for forming a displacement. In one example, a shell 117 is covered outside of the auto-focusing lens module 200 for protecting.

Figure 6:
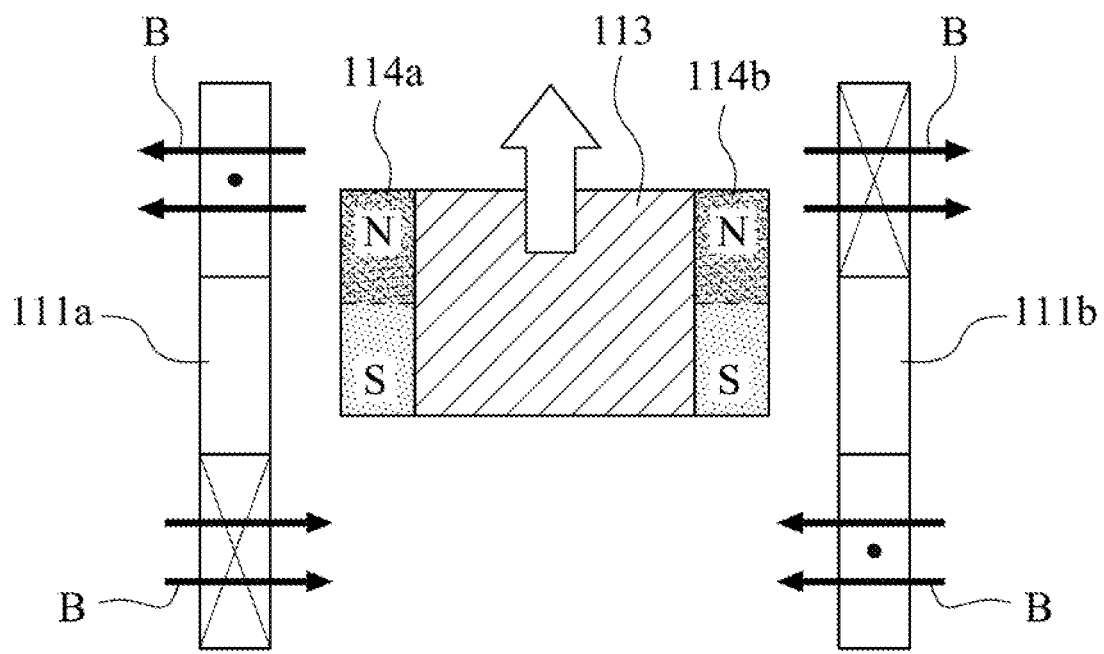
FIG. 6 is a schematic view showing an actuating mechanism of the springless voice coil actuator according to one embodiment of the present disclosure.

FIG. 6 is a schematic view showing an actuating mechanism of the springless voice coil actuator according to one embodiment of the present disclosure. In FIG. 6, the first coil 111a and the second coil 111b are disposed outside of the first main magnetic component 114a and the second main magnetic component 114b. When a current is exerted, current directions in the first coil 111a and the second coil 111b are opposite. To the first coil 111a, the current flows from the lower-half portion of the first coil 111a to the upper-half portion of the first coil 111b; on the contrary, to the second coil 111b, the current flows from the upper-half portion of the second coil 111b to the lower-half portion of the second coil 111b. In the embodiment, the first main magnetic component 114a and the second magnetic component 114b are axially magnetized. The position of the magnetic poles N and S are showed in FIG. 6. To the first coil 111a, a direction of a magnetic force line is toward outside in the upper-half portion; and toward inside in the lower-half portion. A direction of a magnetic force line of the second coil 111b is the same as the first coil 111a. According to the Fleming's left-hand rule, the first coil 111a is coupled with the first main magnetic component 114a and generating an upward pushing force, this is the same to the coupling between the second coil 111b and the second main magnetic component 114b. Therefore, a pushing force is formed to push the slidable base 113 moves upward, and an auto-focusing effect can be achieved.

Figure 7A:
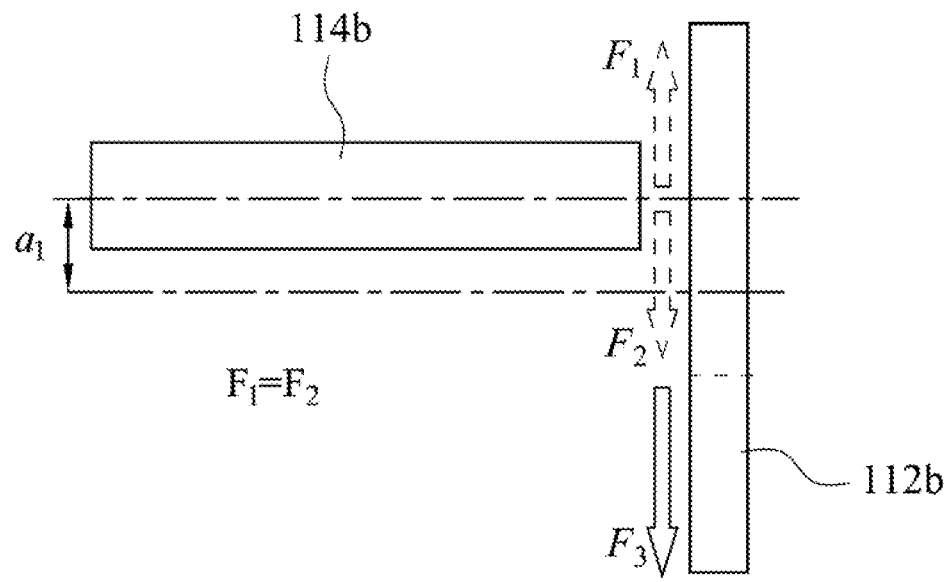
FIG. 7A is a schematic view showing a first status of the first pre-compression magnetic force according to one embodiment of the present disclosure.
Figure 7B:
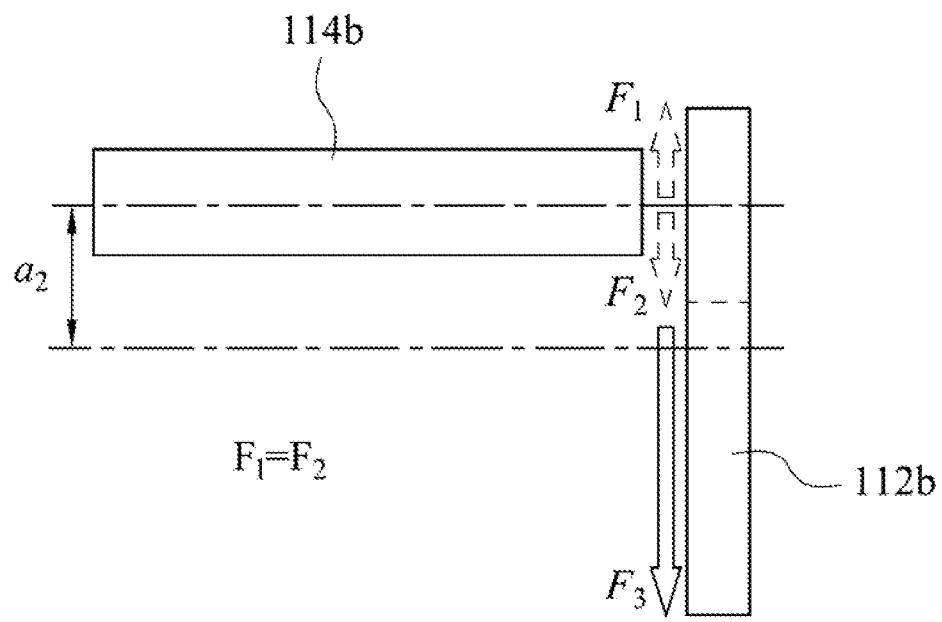
FIG. 7B is a schematic view showing a second status of first the pre-compression magnetic force according to one embodiment of the present disclosure.

FIG. 7A is a schematic view showing a first status of the first pre-compression magnetic force according to one embodiment of the present disclosure, and FIG. 7B is a schematic view showing a second status of the first pre-compression magnetic force according to one embodiment of the present disclosure. In the present disclosure, a magnetic pre-compression force is used for replacing the pre-compression force generated by the elastic force of a spring in a conventional spring-type voice coil actuator.

The first magnetic pre-compression force $F_3$ is generated by the magnetic coupling between the first and the second guiding rods (112a, 112b) and the first and the second main magnetic components (114a, 114b). The whole structure is symmetry, thus only the second guiding rod 112b and the second main magnetic component 114b are taken for example. In the embodiment, the second main magnetic component 114b is axially magnetized, and owing to the symmetry design, radial direction is ignored. In FIG. 7A, a distance between a center line of the second main magnetic component 114b and a center line of the second guiding rod 112b is $a_1$, which means, the center line of the second main magnetic component 114b is located above the center line of the second guiding rod 112b. At the time, two portions of the second guiding rod 112b with the same volume above and under the center line of the second main magnetic component 114b will produce two magnetic attraction forces $F_1$ and $F_2$. The magnetic attraction forces $F_1$ and $F_2$ are equal and opposite. When the magnetic attraction forces $F_1$ and $F_2$ are canceled out, the rest portion of the second guiding rod 112b will produce a downward magnetic attraction force $F_3$, and the magnetic attraction force $F_3$ is the first pre-compression magnetic force.

In FIG. 7B, the center line of the second main magnetic component 114b has been shifted, and a distance between the center line of the main magnetic component 114b and the second guiding rod 112b is $a_2$ ($a_2 > a_1$). At the time, the same as FIG. 7A, two portions of the second guiding rod 112b with the same volume above and under the center line of the second main magnetic component 114b will produce two magnetic attraction forces $F_1$ and $F_2$. The magnetic attraction forces $F_1$ and $F_2$ are equal and opposite, and will be canceled out. But in FIG. 7B, the rest portion of the second guiding rod 112b has larger volume than that in FIG. 7A, thus the magnetic attraction force $F_3$ are larger.

According to FIG. 7A and FIG. 7B, there are two features of the springless voice coil actuator 100 of the present disclosure: (1) When the center line of the second main magnetic component 114b is above the center line of the second guiding rod 112b, the second main magnetic component 114b will be subjected a downward magnetic attraction force, that is, when the second main magnetic component 114b is located above the center line of the second guiding rod 112b, the slidable base 113 will be subjected the downward first pre-compression magnetic force $F_3$; (2) When the distance between the center line of the second main magnetic component 114b and the center line of the guiding rod 112b is larger, the larger downward magnetic attraction force will be produced (with a limited range). In other word, when the slidable base 113 is moved longer, the larger first pre-compression magnetic force $F_3$ will be subjected to the slidable base 113. The aforementioned features are similar to conventional pre-compression force formed by the elastic force of the spring (the elastic force is larger with a longer displacement). Therefore, the first pre-compression magnetic force $F_3$ can replace the elastic force, thus the spring is no longer required in the springless voice coil actuator 100, and a compact size thereof can be achieved.

Figure 8:
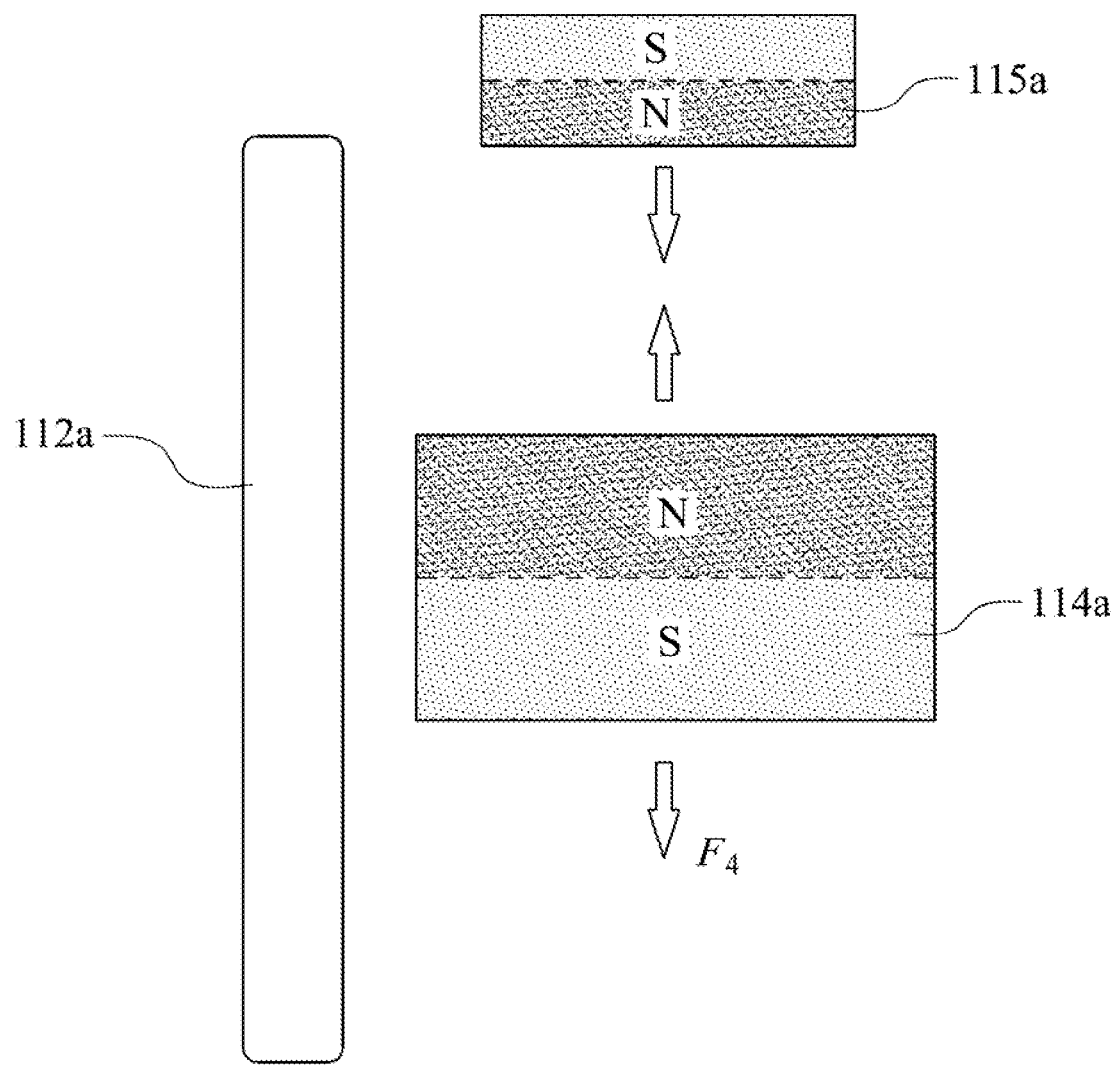
FIG. 8 is a schematic view showing a pre-compression magnetic force calibration structure according to one embodiment of the present disclosure.
Figure 9:
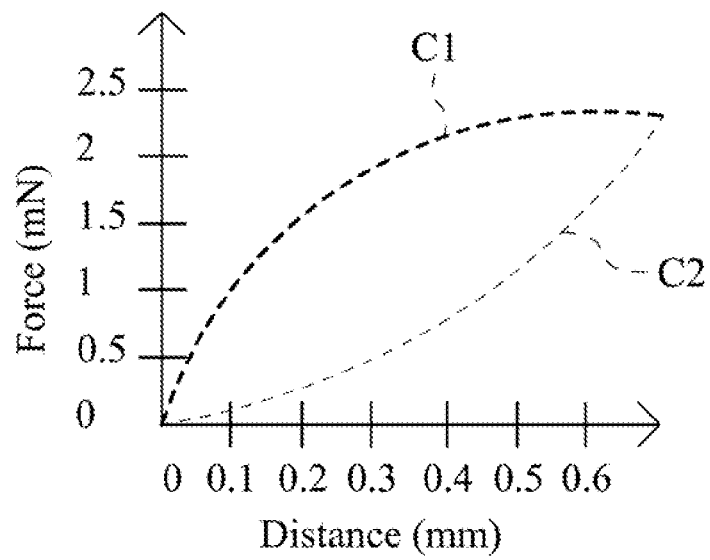
FIG. 9 is a schematic view showing a pre-compression magnetic force calibration method according to one embodiment of the present disclosure.
Figure 9:
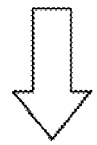
Figure 9:
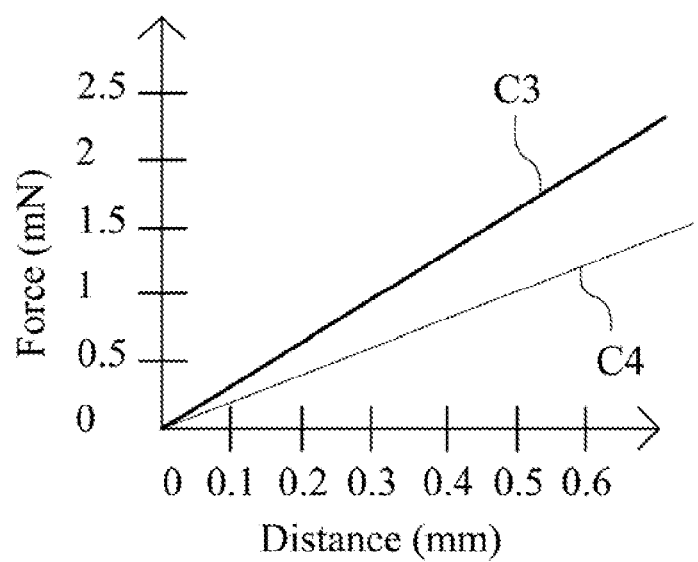

FIG. 8 is a schematic view showing a pre-compression magnetic force calibration structure according to one embodiment of the present disclosure, and FIG. 9 is a schematic view showing a pre-compression magnetic force calibration method according to one embodiment of the present disclosure. In FIG. 7A and FIG. 7B, the first pre-compression magnetic force $F_3$ is used for balancing with a pushing force subjected to the slidable base 113, and thereby the slidable base 113 can be positioned. However, nonlinear output of the conventional magnetic force will make it difficult to control the pre-compression magnetic force $F_3$, thus the slidable base 113 will not be precisionally positioned. In the present disclosure, a first balance magnetic component 115a and a second balance magnetic component 115b are additionally disposed. The purpose of the first and the second balance magnetic components (115a, 115b) is to produce a second pre-compression magnetic force $F_4$ by coupled with the first and the second main magnetic components (114a, 114b). In FIG. 8, the first balance magnetic component 115a is coupled with the first main magnetic component 114a for forming the second pre-compression magnetic force $F_4$. Originally, the first guiding rod 112a is coupled with the first main magnetic component 114a for forming the first pre-compression magnetic force $F_3$, therefore, a linear-outputted total pre-compression magnetic force is produced by the combination of the first pre-compression magnetic force $F_3$ and the second pre-compression magnetic force $F_4$. Therefore, a better control on the displacement of the slidable base 113 can be obtained.

In FIG. 9, a curve C1 represents the first pre-compression magnetic force $F_3$ varied with the displacement, and a curve C2 represents the second pre-compression magnetic force $F_4$ varied with the displacement. When the first pre-compression magnetic force $F_3$ and the second pre-compression magnetic force $F_4$ are combined (the curve C1 and the curve C2 are added), a linear output of the total pre-compression magnetic force can be obtained, as a curve C3. Furthermore, the rigidity of the springless voice coil actuator 100 can be reduced by the pre-compression magnetic force calibration method of the present disclosure. For example, the curve C1 and C2 are adjusted for outputting as a curve C4, thus less force is required, and a consumption of an electric power can be reduced.

Figure 10:
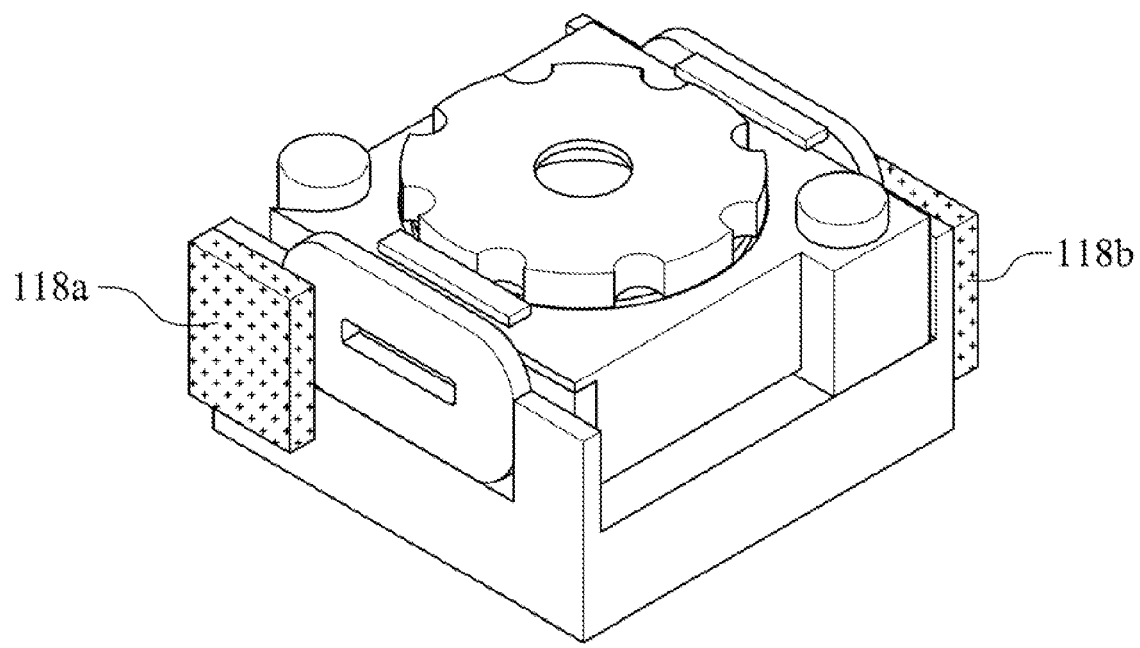
FIG. 10 is a schematic view showing a composition of the first and the second sub-balance component.

FIG. 10 is a schematic view showing a composition of the first and the second sub-balance components (118a, 118b). In FIG. 10, a first sub-balance component 118a and a second sub-balance component 118b are added. The first sub-balance component 118a and the second sub-balance component 118b are coupled with the first and the second main magnetic components (114a, 114b) and produce another third pre-compression magnetic force (not shown). By compositing three pre-compression magnetic forces, a more precision adjustment on the output of the total pre-compression magnetic force can be achieved. The first or the second sub-balance component can be a magnetic component or a magnetic-conductive component. Owing to disposing the first and the second sub-components (118a, 118b), the material choosing of the first and the second guiding rods (112a, 112b) can be more flexible. It is known that the magnetic induction must be occurred between two magnetic components or between one magnetic component and one magnetic-conductive component. Originally, the first and the second guiding rods (112a, 112b) should be magnetic components or magnetic-conductive components, by disposing the first and the second sub-balance components (118a, 118b), it is possible to utilize non-magnetic component for the first and the second guiding rods (112a, 112b). Therefore, the limitation on the material choosing of the first and the second guiding rods (112a, 112b) can be reduced. When the first and the second guiding rods (112a, 112b) are non-magnetic components, the third pre-compression magnetic force is acting as the first pre-compression magnetic force; and when the first and the second guiding rods (112a, 112b) are still magnetic components or magnetic-conductive components, the third pre-compression magnetic force can be combined with the first and the second pre-compression magnetic force for producing more accurate control.

Figure 11:
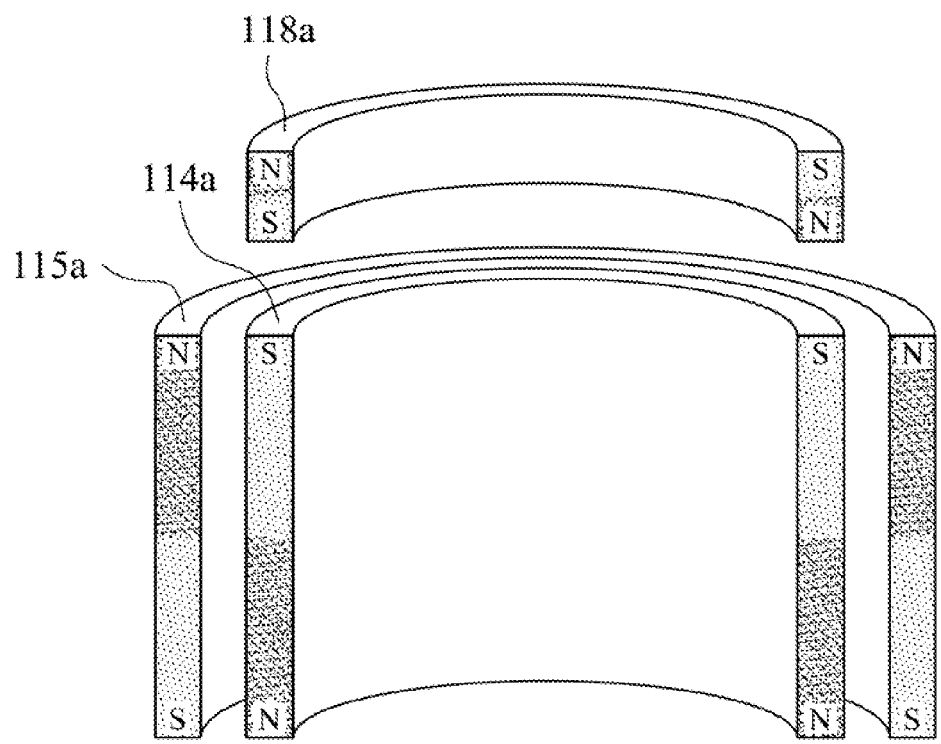
FIG. 11 is a schematic view showing an example of magnetization directions of the main magnetic component, the balance magnetic component and the sub-balance component.
Figure 12:
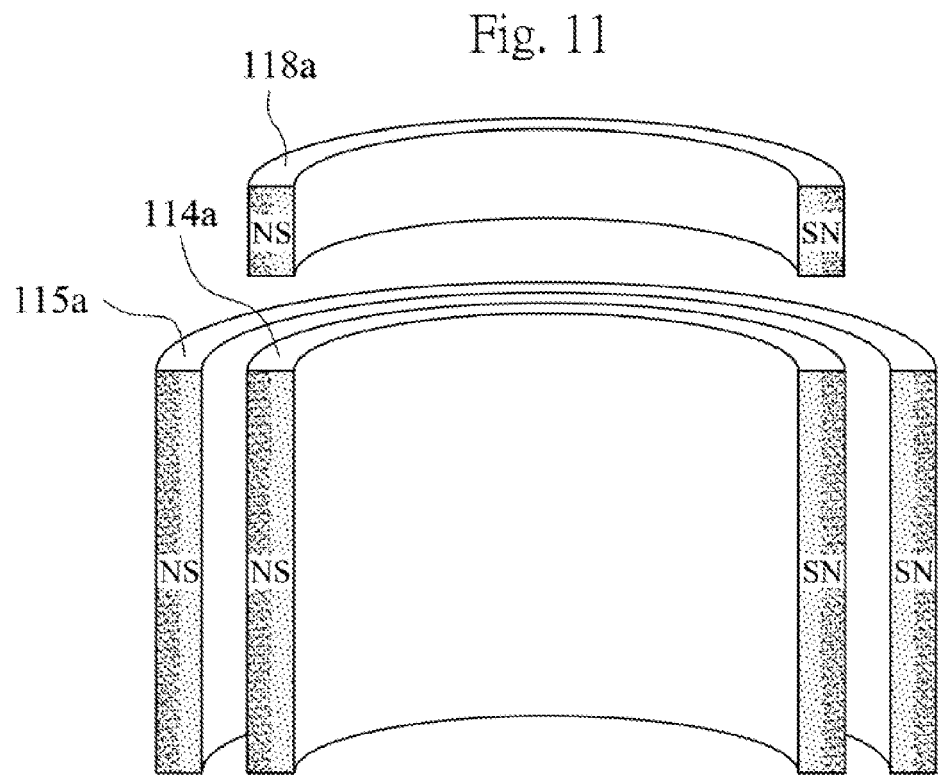
FIG. 12 is a schematic view showing another example of magnetization directions of the main magnetic component, the balance magnetic component and the sub-balance component.

FIG. 11 is a schematic view showing an example of magnetization directions of the main magnetic components (114a, 114b), the balance magnetic components (115a, 115b) and the sub-balance components (118a, 118b), and FIG. 12 is a schematic view showing another example of magnetization directions of the main magnetic components (114a, 114b), the balance magnetic components (115a, 115b) and the sub-balance components (118a, 118b). In the present disclosure, the first and the second main magnetic components (114a, 114b), the first and the second balance magnetic components (115a, 115b), and the first and the second sub-balance components (118a, 118b) can form a symmetry structure, or, can use single-element to form a complete structure. For example, in FIG. 11, only the first main magnetic component 114a, the first balance magnetic component 115a and the first sub-balance component 118a are used for constructing a complete structure. In FIG. 11, the first main magnetic component 114a, the first balance magnetic component 115a and the first sub-balance component 118a are cyclic symmetry structures.

Furthermore, the positions, shapes and magnetization directions of the first and the second main magnetic components (114a, 114b), the first and the second balance magnetic components (115a, 115b) and the first and the second sub-balance components (118a, 118b) have various embodiments. For example, in FIG. 11, the first main magnetic component 114a, the first balance magnetic component 115a and the first sub-balance component 118a are axially magnetized. In FIG. 12, they are all radially magnetized.

Figure 13:
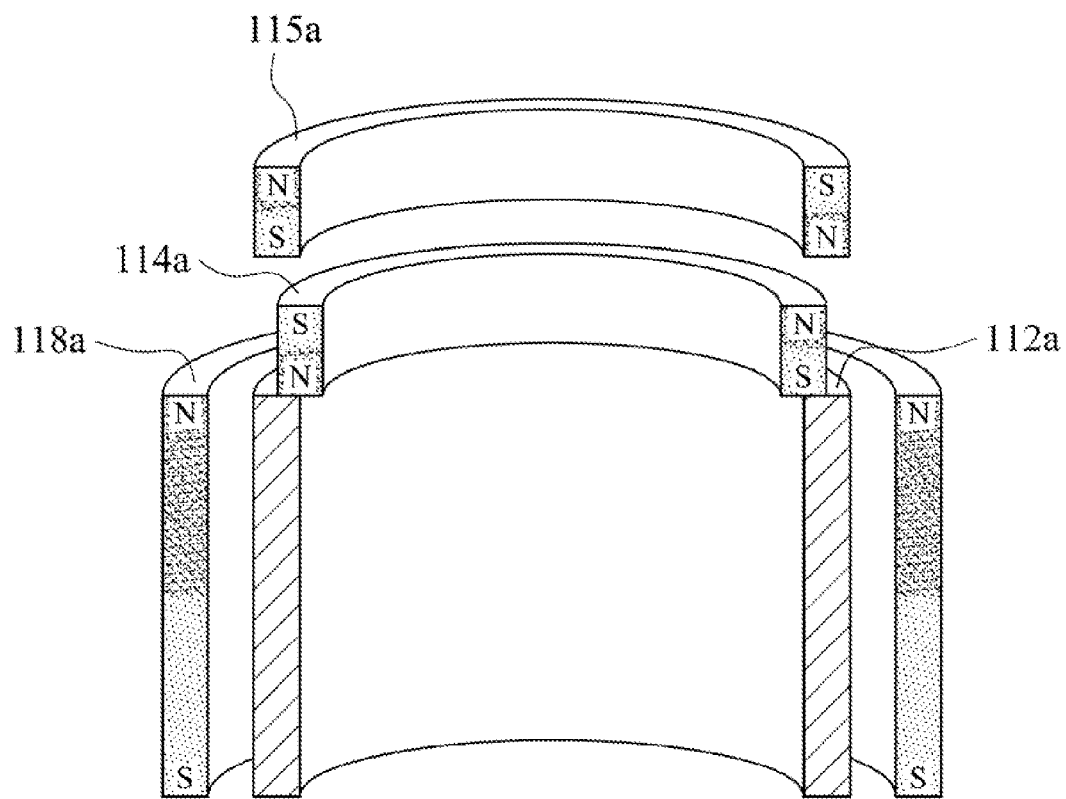
FIG. 13 is a schematic view showing an example of an arrangement of the components of the springless voice coil actuator of the present disclosure.
Figure 14:
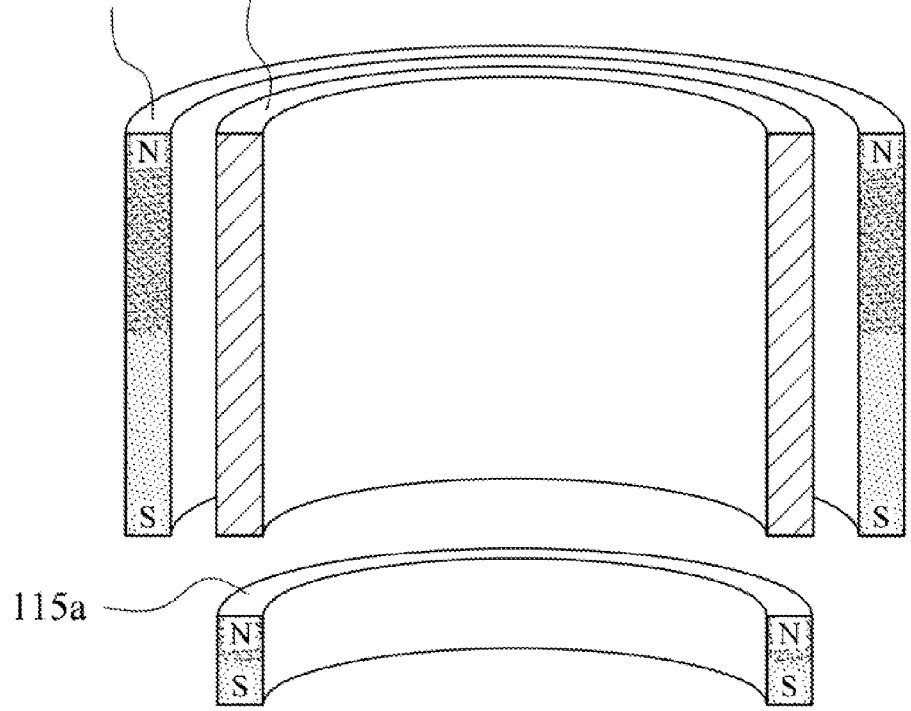
FIG. 14 is a schematic view showing another example of the arrangement of the components of the springless voice coil actuator of the present disclosure.

FIG. 13 is a schematic view showing an example of an arrangement of the components of the springless voice coil actuator 100 of the present disclosure, and FIG. 14 is a schematic view showing another example of the arrangement of the components of the springless voice coil actuator 100 of the present disclosure. In the present disclosure, the first and the second guiding rods (112a, 112b), the first and the second main magnetic components (114a, 114b), the first and the second balance magnetic components (115a, 115b), and the first and the second sub-balance components (118a, 118b) can form a symmetry structure, or, can use single-element to form a complete structure. For example, in FIG. 13, only the first main magnetic component 114a, the first balance magnetic component 115a and the first sub-balance component 118a are used for constructing a complete structure, and they are all cyclic symmetry structures.

Furthermore, the positions and shapes of the first guiding rod 112a, the first main magnetic component 114a, the first balance magnetic component 115a and the first sub-balance component 118a have various embodiments. For example, in FIG. 13, the first guiding rod 112a, the first main magnetic component 114a, the first balance magnetic component 115a and the first sub-balance component 118a are all cyclic symmetry structures. In FIG. 14, the first guiding rod 112a is a magnetic component, and the first main magnetic component 114a surrounds the first guiding rod 112a, therefore, the first sub-balance component 118a is not required. Thus in FIG. 14, it is possible to form a complete springless voice coil actuator 100 only utilizing the first guiding rod 112a, the main magnetic component 114a and the first balance magnetic component 115a.

To sum up, the present disclosure provides a springless voice coil actuator and pre-compression magnetic force calibration method thereof. By composing the first pre-compression magnetic force and the second pre-compression magnetic force, it is possible to produce a linear-outputted total pre-compression magnetic force. Therefore, the more precision control of the slidable base can be obtained. Furthermore, the pre-compression magnetic force is utilized to replace the elastic force of the spring, thus a compact size of the springless voice coil can be achieved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A springless voice coil actuator comprising:
a base;
a coil disposed on the base;
a guiding rod disposed on he base;
a slidable base configured for sliding along the guiding rod to a predetermined direction;
a main magnetic component connected to the slidable base; and
a balance magnetic component coupled with the main magnetic component for generating a magnetic induction;
a sub-balance component coupled with the main magnetic component for generating a magnetic induction;
wherein when a current is exerted to the coil, the main magnetic component is coupled with the coil for generating a pushing force that pushes the slidable base; the main magnetic component is coupled with the guiding rod for generating a first pre-compression magnetic force; the balance component magnetic component is coupled with the main magnetic component for generating a second pre-compression magnetic force; the sub-balance component is coupled with the main magnetic component for generating a third pre-compression magnetic force; the first pre-compression magnetic force is combined with the second pre-compression magnetic force and the third pre-compression magnetic force for generating a linearly outputted total pre-compression magnetic force; and the total pre-compression magnetic force is axially balanced with the pushing force and linearly positioning the slidable base.

2. The springless voice coil actuator of claim 1, wherein the guiding rod is a magnetic component or a magnetic-conductive component.

3. The springless voice coil actuator of claim 1, wherein the main magnetic component or the balance magnetic component is axially magnetized or radially magnetized.

4. A pre-compression magnetic force calibration method applicable to the springless voice coil actuator of claim 1, comprising:
generating the first pre-compression magnetic force by coupling the main magnetic component and the guiding rod;
generating the second pre-compression magnetic force by coupling the balance magnetic component and the main magnetic component;
generating the third pre-compression magnetic force by coupling the sub-balance component and the main magnetic component; and
combining the first pre-compressing magnetic force, the second pre-compression magnetic force and the third pre-compressing magnetic force and generating a linearly-outputted total pre-compression magnetic force to axially balance the pushing force and linearly position the slidable base.

5. The pre-compression magnetic force calibration method of claim 4, wherein the sub-balance component is a magnetic component or a magnetic-conductive component.

6. A springless voice coil actuator comprising:
a base;
a coil disposed on the base;
a slidable base configured for sliding to a predetermined direction relative to the base;
a main magnetic component connected to the slidable base; and
a balance magnetic component coupled with the main magnetic component for generating a magnetic induction;
a sub-balance component coupled with the main magnetic component for generating a magnetic induction;
wherein when a current is exerted to the coil, the main magnetic component is coupled with the coil for generating a pushing force that pushes the slidable base; the balance magnetic component is coupled with the main magnetic component for generating a first pre-compression magnetic force; the sub-balance component is coupled with the main magnetic component for generating a second pre-compression magnetic force; the first pre-compression magnetic force is combined with the second pre-compression magnetic force for generating a linearly-outputted total pre-compression magnetic force; and the total pre-compression magnetic force is axially balanced with the pushing force and linearly positioning the slidable base.

7. The springless voice coil actuator of claim 6, further comprising:
a guiding rod disposed on the base; and
an opening formed on the slidable base and configured for installing the guiding rod.

8. The springless voice coil actuator of claim 7, wherein the guiding rod is a non-magnetic component.

9. The springless voice coil actuator of claim 6, wherein the main magnetic component, the balance magnetic component or the sub-balance component is axially magnetized or radially magnetized.

10. The springless voice coil actuator of claim 6, wherein the sub-balance component is a magnetic component or a magnetic-conductive component.

11. A pre-compression magnetic force calibration method applicable to the springless voice coil actuator of claim 6, comprising:
- generating the first pre-compression magnetic force by coupling the balance magnetic component and the main magnetic component;
- generating the second pre-compression magnetic force by coupling the sub-balance component and the main balance component; and
- combining the first pre-compressing magnetic force and the second pre-compression magnetic force and generating a linearly-outputted total pre-compression magnetic force to axially balance the pushing force and linearly position the slidable base.

* * * * *